United States Patent [19]

Dressler

[11] 4,023,420
[45] May 17, 1977

[54] CONTROL DEVICE FOR A BAR TRANSFER

[75] Inventor: Bruno Dressler, Boulogne-Billancourt, France

[73] Assignee: Regie Nationale des Usines Renault, Boulogne-Billancourt, France

[22] Filed: Dec. 24, 1974

[21] Appl. No.: 536,097

[30] Foreign Application Priority Data
Dec. 28, 1973 France .............................. 73.46912

[52] U.S. Cl. ................................................ 74/52
[51] Int. Cl.² ...................................... F16H 37/12
[58] Field of Search ........................................ 74/52

[56] References Cited

UNITED STATES PATENTS

| | | | |
|---|---|---|---|
| 1,557,223 | 10/1925 | Warner | 74/52 |
| 3,290,950 | 12/1966 | Carlson | 74/52 |

FOREIGN PATENTS OR APPLICATIONS 602,010  2/1960  Italy ...................................... 74/52

Primary Examiner—Samuel Scott
Assistant Examiner—Wesley S. Ratliff, Jr.
Attorney, Agent, or Firm—Fleit & Jacobson

[57] ABSTRACT

Control device for bar transfer comprising a lever driven in rotation about a fixed axis, an arm mounted rotating on the lever around an axis parallel to the preceding axis, the arm being further connected to the bar transfer by a catch-pin of axis parallel to the aforesaid axes, the lever and the arm having the same length between the axes in question, and a mechanism being provided to drive the arm at a relative angular velocity double that of, and in the opposite direction to that of, the lever, wherein there is provided a drive mechanism for the lever comprising a drive element with cycloidal trajectory to modulate the speed of rotation of the lever and thus of displacement of the bar.

10 Claims, 11 Drawing Figures

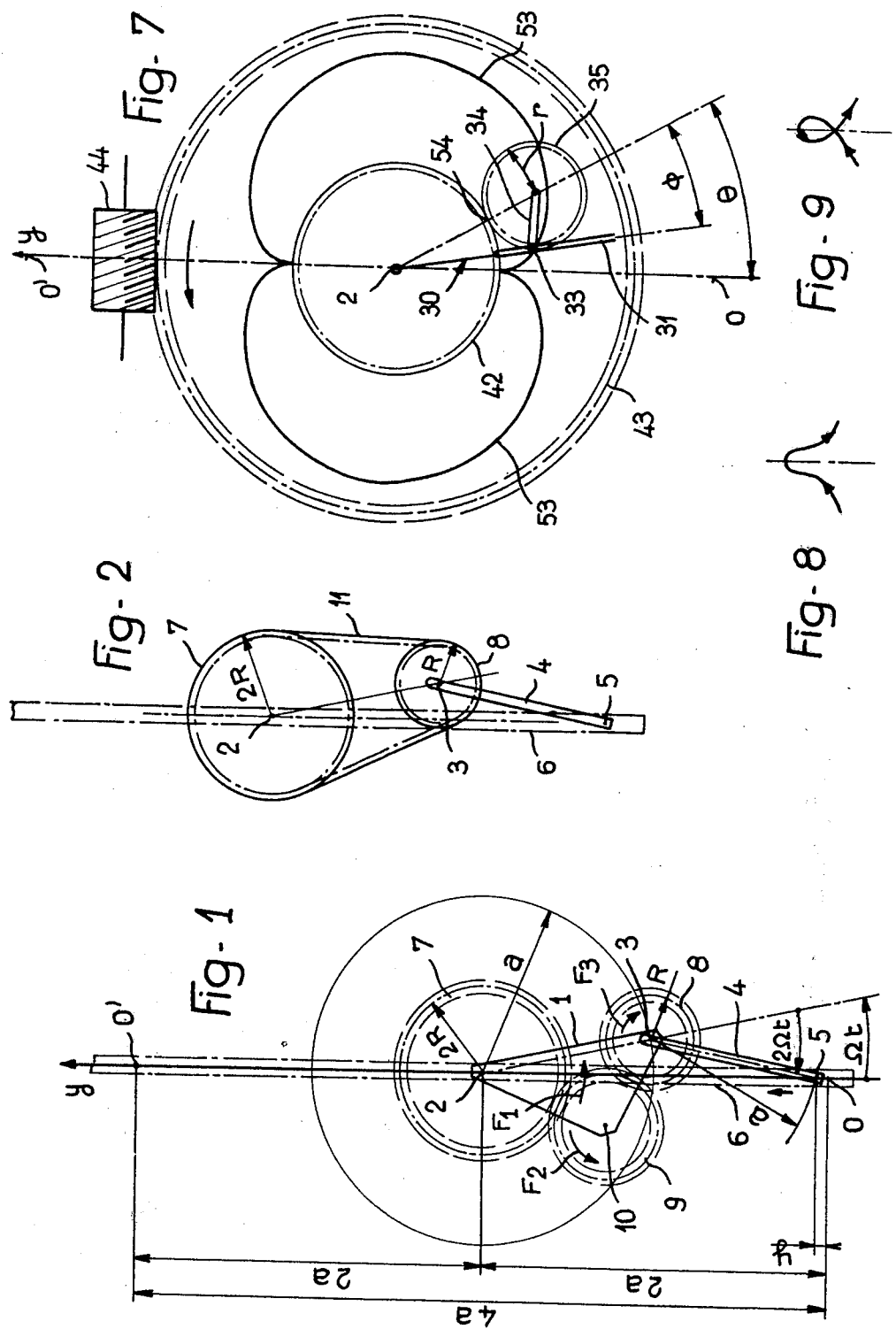

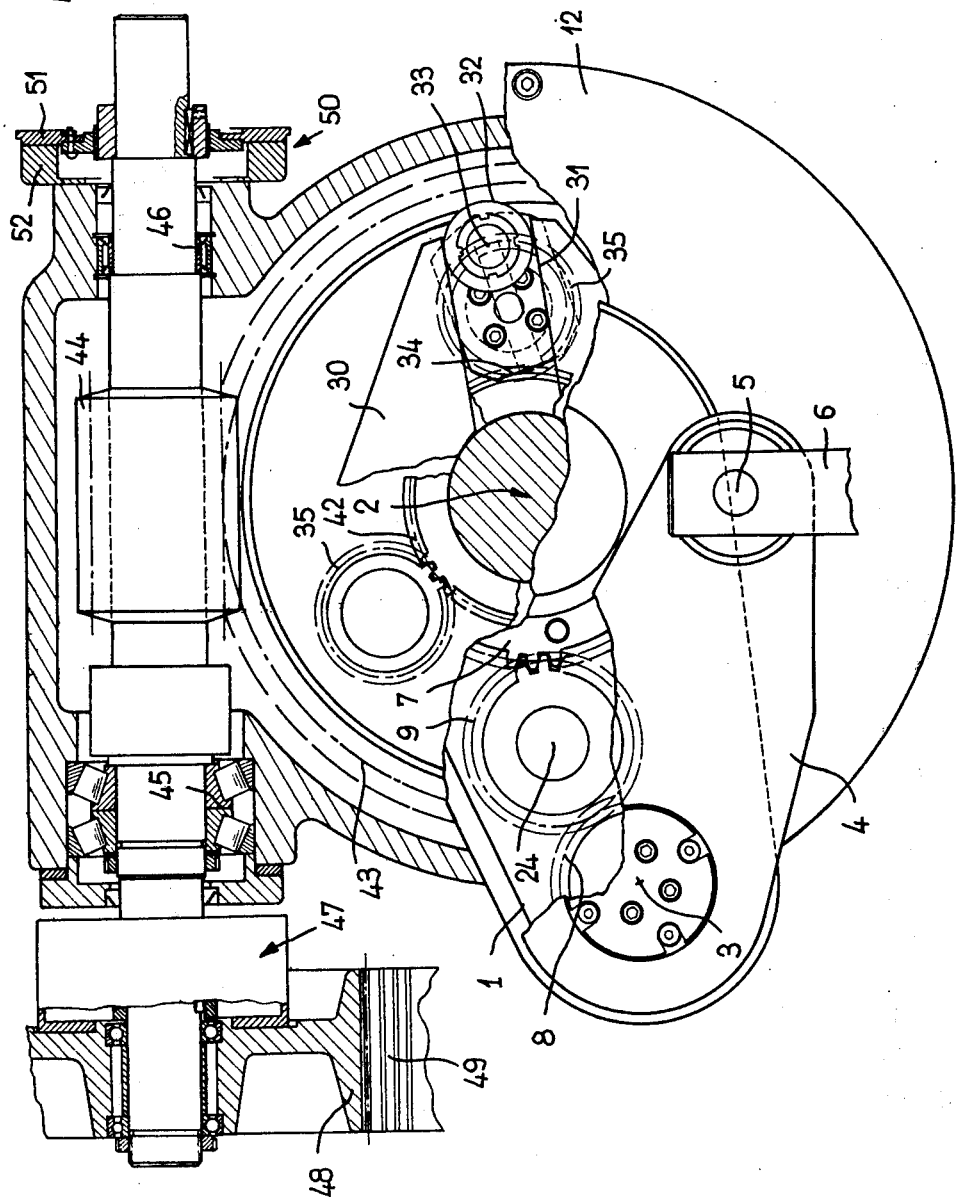

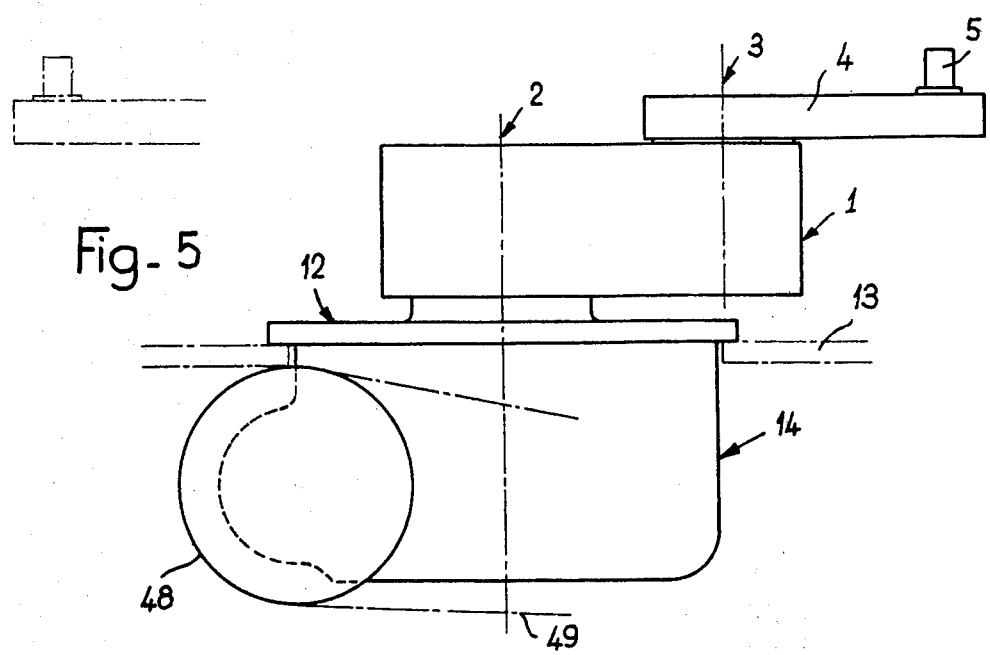
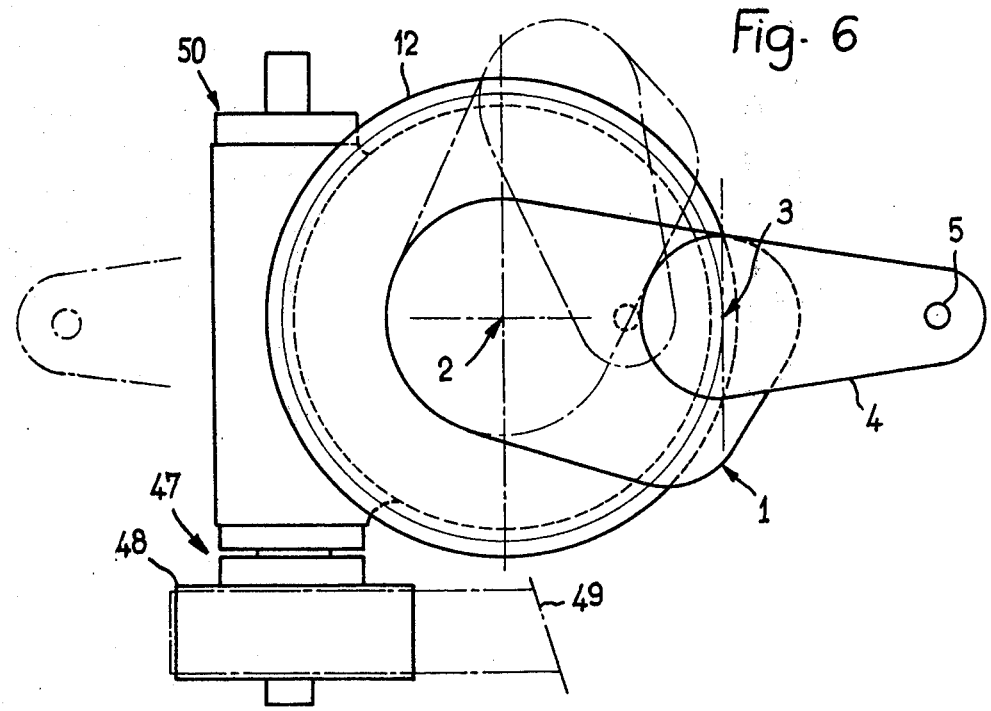

CONTROL DEVICE FOR A BAR TRANSFER

The invention relates to a control device for a bar transfer of parts from one point of a machine to another, in which the various points, linearly spaced in uniform steps, can be machining points, control points or assembly points.

The parts may be transferred alone or with the mountings on which they are fixed.

The invention is thus applicable in the field of tooling machines, assembly machines and control machines, the machines being able to be transfer machines as such, or a series of classic machines or special machines.

All kinds of devices have been used to operate bars for the transfer of parts:
screw and nut,
rack and pinion,
rod - crank,
pneumatic and hydraulic jacks,
combinations of several of these mechanisms.

With a motor with a constant angular velocity, the screw and nut, and rack and pinion systems give a constant speed of removal, but with no acceleration and hazardous end points in the two directions of travel. The pneumatic and hydraulic jacks have a sensitively constant acceleration which necessitates an inversion of pressure at a given moment, and, in spite of their apparent simplicity, are often the cause of difficulties in present use. In fact, all the mechanisms (screw and nut, rack and pinion, jacks) run harshly and with bumps.

Due to the play in the transmissions and due to the elastic deformations when the parts are put under stress at each transfer, the sinusoidal movement itself with rod-crank connection "knocks" from the point when a displacement length of 1 in less than 5 to 6 seconds is desired.

More complex mechanisms with weak acceleration at starting, and weak deceleration at the end of the stroke have been produced. These mechanisms ensure smooth and quiet displacements. Unfortunately, they necessitate a guiding of the bar-transfer on the right of the drive for said bar and their lateral disposition, or extending to the ground, which is inconvenient for the personnel, limits the means of access for the parts and mountings. Generally they necessitate a considerable elongation of the machine. They are, in addition, cumbersome and highly priced.

Moreover, to reduce the idle periods of the machines, the users now demand the time for the transfer of parts to be as low as possible. With a sinusoidal movement control, this leads, for example for the transfer of a total load of 7 tonnes to 1.50 m in 2 seconds, to:

| | |
|---|---|
| energy to overcome the friction on the first half-stroke | 5 250 j |
| maximum kinetic energy at the end of half-stroke | 5 100 j |
| Total in one second | 10 350 j | let us say, at 50% efficiency, a mean power of 20kw. The maximum power demanded may even reach 28kw.

Since the times of operation of the machines are also continuously decreasing, it would be expedient to start motors of this power several times a minute, in a continuous manner, which is practically unacceptable.

Taking into account the above remarks, the invention aims in the first place at effecting a control device for bar transfer:
ensuring a rectilinear trajectory from the drive point of the bar transfer that is sufficiently rigid to make any guiding near the bar transfer superfluous,
communicating at the drive point of the bar a cyclic movement of sinusoidal type at precise stroke ends in the forward and reverse strokes;
and one which easily lends itself to being driven by a modulating mechanism of the laws of velocity and acceleration of the drive point of the bar.

To this end, the control drive for bar transfer according to the invention, comprising a lever driven in rotation around a fixed axis, an arm mounted turning on the lever around an axis parallel to the previous axis, this arm being further connected to the bar transfer by a catch pin having an axis parallel to the previously mentioned axes, the lever and the arm having the same distance between the axes in question and a mechanism being provided to drive the arm at a relative angular speed double that of, and in the opposite direction to, that of the lever, is essentially characterized in that it comprises a mechanism for driving the lever comprising a driving element with a cycloidal trajectory to modulate the speed of rotation of the lever and thus that of the displacement of the bar.

The invention aims, moreover, at the production of various modulating mechanisms and certain forms of construction permitting:
discomfort for the personnel to be avoided,
the horizontal forwarding or withdrawing plane for the mountings or parts to be totally disengaged,
the space above the manoeuvring zone for the mountings and parts to be left free.

Several forms of construction of the control device for bar transfer according to the invention are hereinafter described, by way of example and with reference to the attached drawings, in which:

FIG. 1 is a partial schematic plan view according to the invention, intended to illustrate its kinematics;

FIG. 2 is a similar view of another device according to the invention;

FIG. 4 is a partial plan view with various details of the device of FIG. 3 and a representation in axial section of driving means;

FIG. 5 is an exterior view in elevation and in smaller scale of the device of FIG. 3 and 4;

FIG. 6 is a plan view and in smaller scale of the device of FIG. 3 and 4;

FIG. 7 is a schematic plan view illustrating the kinematics of the modulating mechanism of the device of FIGS. 3 and 4;

FIGS. 8 and 9 illustrate two variations of the kinematics of FIG. 7;

Figure 3:
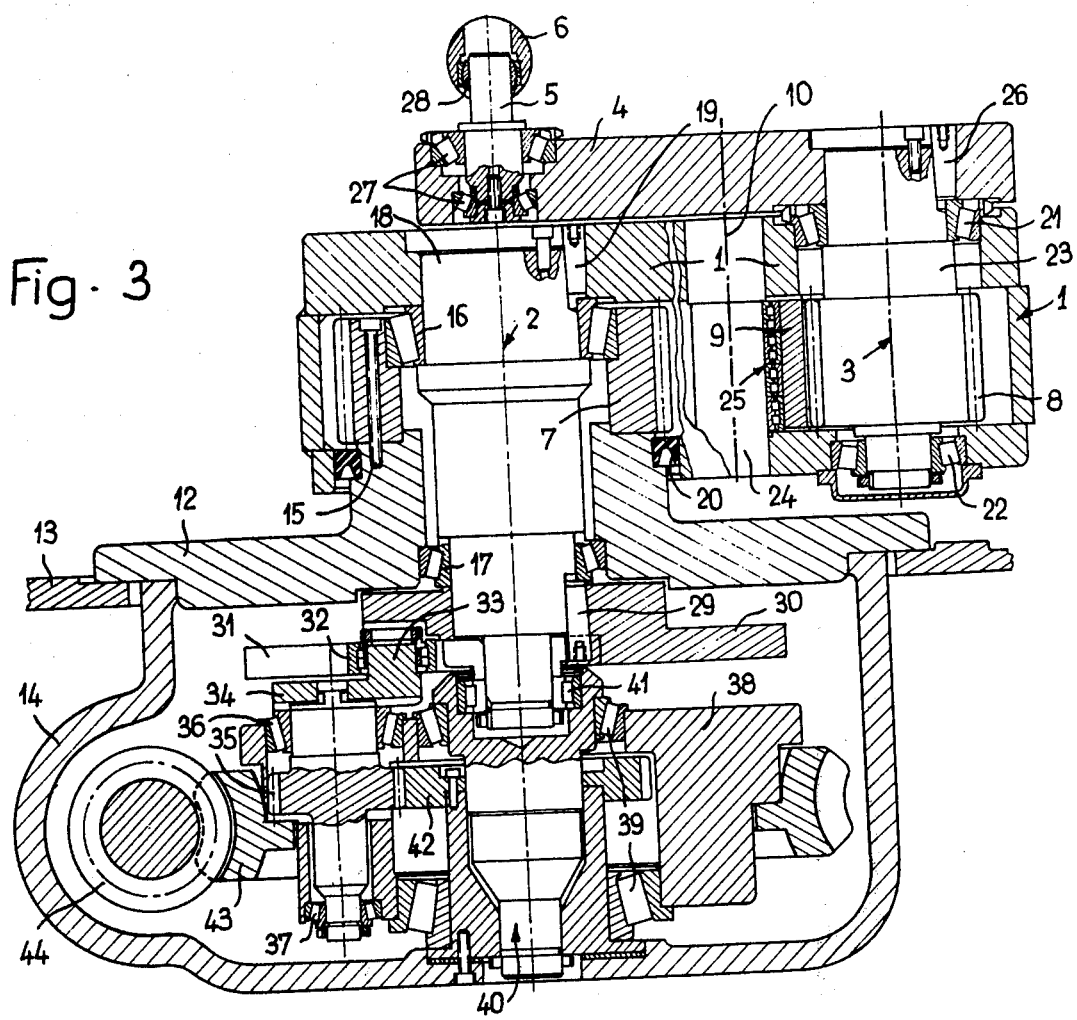
FIG. 3 is a view in elevation and axial section of a form of construction of a device according to the diagram of FIG. 1 and comprising in addition a modulating mechanism.

The device shown in FIG. 1 comprises a lever 1 intended to be driven in rotation around a fixed axis 2. At the free end of this lever is mounted turning around an axis 3 parallel to the axis 2, an arm 4 whose free end bears a catch pin 5 of the end of a transfer bar 6, this pin being parallel to the axes previously mentioned. The lever 1 and the arm 4 have the same length between the axes 2 and 3 on the one hand, and the axis 3 and that of the pin 5 on the other hand.

A mechanism, provided to drive the arm 4 at a relative angular velocity double that of and in the opposite direction to that of the lever 1, is composed, in the case of FIG. 1, of a fixed toothed gear wheel 7 coaxial to the axis 2, of a toothed wheel 8 rigid with the arm 4 and coaxial to its axis of rotation 3, and of an intermediate pinion 9 mounted turning on the lever 1 around an axis 10 in such a way as to be in constant engagement with the gear wheel 7 and the wheel 8, the number of teeth of the latter being equal to half that of the gear wheel 7.

The previously mention state of relative angular velocity double and oppositely directed between arm 4 and lever 1 can likewise be ensured in a simple manner as illustrated in FIG. 2, by a belt 11 engaged with the teeth of the gear wheel 7 and the wheel 8. This belt can be a chain engaged with a toothed gear wheel and a wheel, or a toothed belt engaged with a gear wheel and a wheel formed of toothed pulleys. Thus, (see FIG. 1) when the lever 1 turns about its axis 2 at the angular velocity $\Omega$ in the direction of the arrow F1, the wheel 8 with radius R, which meshes with the intermediary pinion 9 turning on the gear wheel 7 of radius 2R in the direction of the arrow F2, turns about the axis 3 in the direction of the arrow F3 at an angular velocity of $-2\Omega$. Consequently, the catch pin 5 of the bar transfer described a straight segment 0 0' whose axis 2 is the centre and whose total length is $4a$ if one designates by $a$ the length of the lever 1 and the arm 4 measured as already indicated. Taking $\Omega$ as constant, O as origin of the ordinates, $y$ as coordinate of the pin 5 on the line O, O', the segment line 2, 0 as origin of the angles, and the direction of trigonome trical rotation, the equations of the movement of the pin 5 are:

$$y = 2a - 2a \cos \Omega t \quad (1)$$
$$\text{velocity} = d\,y/d\,t = 2a\,\Omega \sin \Omega t \quad (2)$$
$$\text{acceleration} = d^2\,y/d\,t^2 = 2a\,\Omega^2 \cos \Omega t \quad (3)$$

FIGS. 3 and 4 correspond to a practical form of construction of a device according to FIG. 1, to which is added a modulating mechanism whose kinematics will be seen later.

The device comprises a supporting stand 12 intended to be fixed on the housing 13 of the transfer path, this stand being surmounted by the parts of the device corresponding to those of FIG. 1 and which will be quoted by the same reference numbers, whereas it is provided under its lower part with a casing 14 containing said modulating mechanism and its means of drive.

On the stand 12 is fixed by a screw 15 the toothed gear wheel 7, which forms with it a vertical bearing block in which is mounted, on bearings 16, 17 a shaft 18 of geometric axis 2. On the upper part of the shaft 18 is mounted wedged at 19, the lever 1, which forms a rotating housing, mounted tightly around the stand by the interposition of a joint 20.

This housing forms a vertical bearing block in which is mounted, on bearings 21, 22 of geometric axis 3, the hub 23 of the toothed wheel 8 of geometric axis 3. This housing thus encloses a fixed vertical axis 24 of geometric axis 10, around which is mounted, with interposition of bearing 25, the intermediary pinion 9. The hub 23 of the toothed wheel 8 projects out of the housing at its upper part, on which is wedged at 26 the arm 4. On the latter is mounted vertically with interposition of bearings 27, the catch pin 5 of the bar transfer 6, the latter forming a connecting ball and socket joint 28 between the pin and the bar.

At the lower part of the shaft 18, projecting beneath the stand 12 is wedged at 29 a wheel 30 for driving in rotation of the lever 1. This wheel 30 is here made to rotate by a modulating mechanism which constitutes a particular application of the device for driving a part in discontinuous rotations, the object of the French Pat. No. 2,188,745. The wheel 30 has at least one radial groove 31 (preferably three) with which interacts, without clearance, a roller 32 mounted on bearings on a crank-pin 33 carried by a crank plate 34. The latter is mounted rigidly with a planet pinion 35, itself mounted on bearings 36, 37 situated eccentrically in a disc 38 which is mounted rotatably, by the intermediary of bearings 39, on a central composite pivot 40. This pivot 40 is centered by a bearing 41 on the lower part of the shaft 18 and fixed by a screw on the base of the housing 14 in such a way that it has the geometric axis 2 in common with the shaft 18.

Around the pivot is fixed a toothed gear wheel 42 with the same geometric axis with which engages the or each planet pinion.

On the periphery of the disc 38 is further fixed a toothed control wheel 43, with which cooperates a worm screw 44 whose shaft is mounted on bearings at 45, and 46 in two bearing blocks located on the housing (see FIG. 4). This shaft is provided at one of its ends projecting out of the housing with an electromagnetic coupling connection 47 in rotation with a toothed pulley 48 mounted freely on this axis and driven by a toothed belt 49 driven by a toothed driving pulley (not shown), itself driven by a motor. A fly wheel can be connected to the pulley 48 or this can be weighted accordingly. At the other end of the shaft of the worm screw 44 projecting from the housing is disposed an electromagnetic brake 50, here comprising a friction disc 51 rigid in rotation with the screw which can be axially drawn against a fixed plate 52 by electromagnetism.

FIGS. 7, 8 and 9 show the operation of the modulating mechanism with angular velocity. Each planet 35 of radius $r$ runs on the fixed wheel 42 of radius $2r$ and the crank pin 33 describes an epicycloid:

normal with two reversing points if the shaft of the crank pin 33 is at the distance $r$ from the shaft of the planet 35 (example, FIG. 7);

shortened with two rounded reversing points if the shaft of the crank pin 33 is at a distance from the shaft of the planet 35 smaller than $r$ (example, FIG. 8);

lengthened with two looped reversing points if the shaft of the crank pin 33 is at a distance from the shaft of the planet 35 greater than $r$ (example, FIG. 9).

The sinusoidal movement of the pin 5 is corrected by replacing in the preceding equation (1), the angle $\Omega t$ with the angle $0,\widehat{2,33} = \theta - \phi$ and finally the equation of the movement of the pin 5 becomes:

$$y = 2a - 2a \cos(\theta - \phi) \quad (4)$$

with $$\sin \phi = \frac{\sin \theta \cdot \cos \theta}{\sqrt{1 + 3 \sin^2 \theta}} \quad 5)$$

(this equation being obtained by the solution of the triangle 2,33,54); and $$\theta = \Sigma_o^t \omega \cdot \Delta t, \quad 6)$$

$\omega$ being the variable drive velocity of the wheel 43.

There thus results for the movement of the catch pin 5:
- always a rectilinear trajectory in backward and forward motion following the line setment 0, 0' of FIG. 1;
- a zero velocity at 0 increasing to 2 then decreasing to become zero again at 0';
- a zero acceleration at 0, increasing to a maximum (corresponding approx. to $y = 0.075a$) decreasing then to zero at 2, then becoming negative and passing through a symetrical minimum of the aforesaid maximum with reference to 2, and finally coming back to zero again in 0'. The groove or grooves 31, as a rule straight and radial, can, however, be formed as curved in order to complete the angular variation of velocity introduced by the modulating mechanism.

One will note the interest of the following technological details;
- the drive mechanism of the arm 4 proceeding from the movement of the lever 1 is enclosed in the rotary housing which the latter constitutes and is protected by a joint situated under the latter around its axis of rotation, a favourable arrangement for an efficient and durable sealing;
- by giving the wheel 8 and the intermediary pinion 9 the same number of teeth one avoids, should accidental jagging or deformation of a couple of teeth occur, the deformation of the other teeth during operation, and one needs only to repair the damaged couple;
- the fixing of the device by its stand 12, with the aid of screws or bolts, on the housing or frame of the transfer path, without having to rest on the ground, FIGS. 5 and 6 being illustrative of such a disposition of the described device;
- the non-alignment of the axes 3, 10 with the axis 2, which allows the same gear wheels 7, wheel 8 and pinion 9 to be used for different values of the distance between centres 2–3 fixed as a function of the desired course of the bar transfer.

Figure 10:
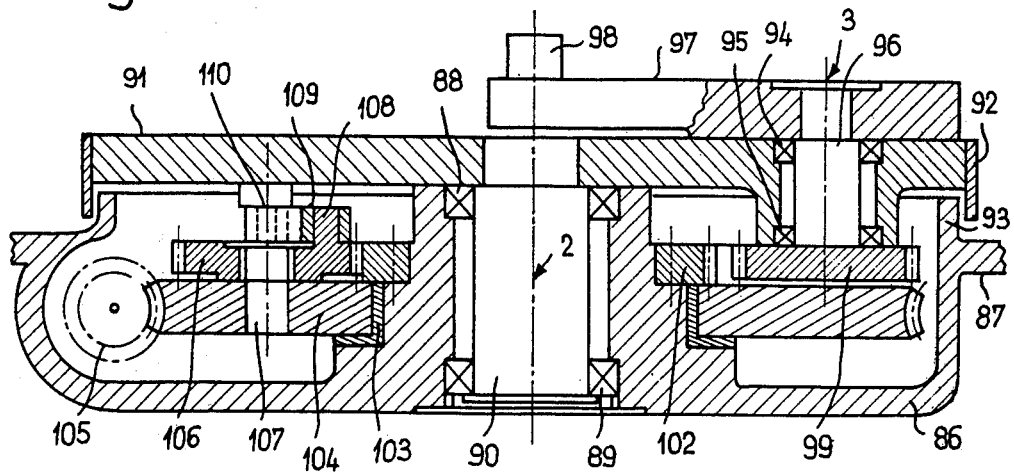
FIG. 10 is a view in elevation and axial section of another form of construction of a device according to the invention with modulating mechanism.
Figure 11:
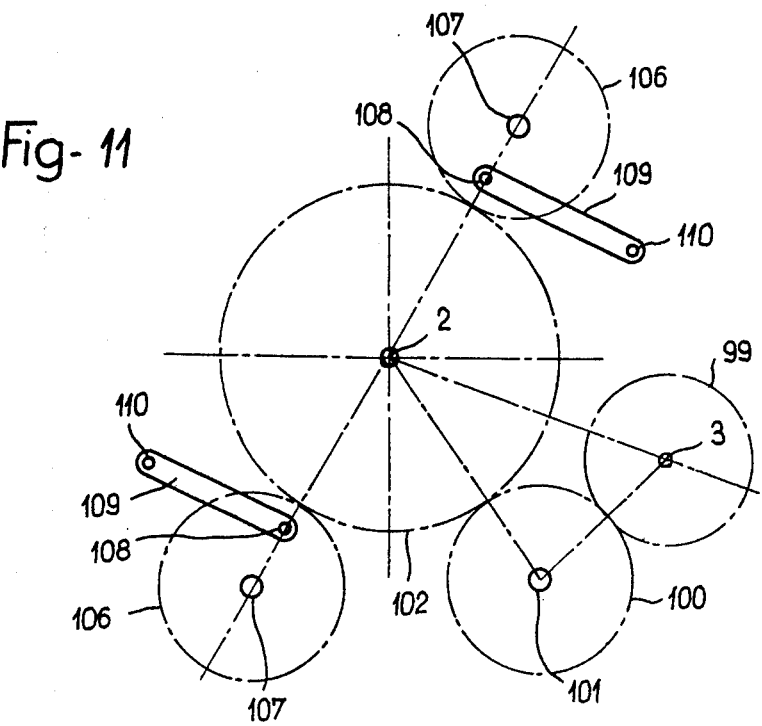
FIG. 11 is a schematic plan view illustrating the kinematics of the device of FIG. 10.

FIGS. 10 and 11 represent another variant of a device according to the invention with a modulating drive mechanism, and which is remarkable for its compactness.

This device comprises a housing 86 surrounded by a flange 87 on the housing of the transfer path. This housing forms in its centre a vertical bearing block in which is mounted on bearings 88, 89 a shaft 90 of geometric axis 2. At the upper part of the shaft 90 projecting above the housing, is wedged a lever 91 in the form of a circular disc provided with a flange 92 surrounding an upper cylindrical flange 93 of the housing to protect its internal mechanism.

On the lever 91 is located a vertical eccentric bearing block in which is mounted, on bearing 94, 95, a shaft 96 of geometric axis 3. At the upper part of this shaft is wedged an arm 97 bearing a catch pin 98 of the bar transfer not shown. The geometric axis of the pin 98 and the axis 2 of the shaft 90 are equidistant from the axis 3 of the shaft 96. At its lower part the latter carries, wedged on it — or integral with it — a pinion 99 which (see FIG. 11) is constantly engaged with a pinion 100 mounted freely on a shaft 101 parallel to the axis 3 and carried by the lever 91. This pinion 100 serves as an intermediary between the pinion 99 and a toothed gear wheel 102 which is fixed on a shoulder of the housing 86, concentrically to said vertical bearing block and with interposition of an antifriction block 103, a toothed control wheel 104, driven by the intermediary of a worm screw 105, which can be mounted in the housing 86 and driven as already described for the worm screw 44. This wheel 104 is connected to the lever 91 by a modulating mechanism comprising at least one planet pinion 106 mounted freely on a shaft 107 carried by the wheel and engaging with the fixed gear wheel 102, this planet pinion being further provided with an eccentric crank pin 108 which is connected by the intermediary of a tie-rod 109 to a shaft 110 rigid with the lever 91.

By giving $n$ teeth to each of the pinions 99 and 106 (and preferably the same number of teeth to the intermediary pinion 100), and $2n$ teeth to the gear wheel 102, one obtains an operation of the device which is similar to that having been set out for the whole device according to FIGS. 3 and 4, i.e. an identical kinematics, the difference lying in the method of transmission of the movement from the modulating mechanism to the lever, which is here effected by tie-rods. It is true, transmission by rollers and grooves, as in FIGS. 3 and 4, could equally well be used.

Although more particularly designed to be used in the field of machine tools, and particularly that of mass production, the present invention may of course be advantageously applied anywhere where the step by step displacement of parts, parcels and goods has to be effected.

The absence of all exterior guidance to ensure a straight transfer from the catch pin, the total clearance of the space above the plane traversed by the rotating arm, and the compactness of the assembled mechanism in a compressed area around the vertical line of the middle of the path, makes the device of the object of the invention easy to install.

What is claimed as new is:
1. Control device for bar transfer comprising a lever driven in rotation about a fixed axis, an arm rotatably mounted on said lever for rotation about an axis parallel to said fixed axis, said arm connected to the bar transfer by a catch-pin having an axis parallel to the aforesaid axes, said lever and said arm having the same length, means for driving the arm at a relative angular velocity double that of, and in the opposite direction to that of, said lever, and means for driving said lever comprising a fixed toothed gear wheel coaxial with said fixed axis of rotation of said lever and at least one planet pinion meshing with and rotatably driven around said fixed toothed gear wheel, said planet pinion having an eccentrically disposed crank pin and a driving connection being provided between said crank pin and said lever whereby the angular velocity of said lever is modulated as a function of the cycloidal trajectory of said crank pin and thus the displacement of the bar.

2. A control device for a bar transfer according to claim 1, wherein said means for driving said lever comprises a drive wheel rigidly connected with said lever, said drive wheel including a groove in which said crank pin is in engagement.

3. Control drive for a bar transfer according to claim 2, wherein said planet pinion is mounted eccentrically on a driven control wheel, said driven control wheel associated with said fixed toothed gear wheel which meshes with said planet pinion, said driven control wheel and gear wheel coaxial to said fixed axis of rotation of said lever, the number of teeth of said planet pinion being equal to half that of said toothed gear wheel, and wherein said crank pin is eccentrically connected with and adjacent to the radius of said planet pinion.

4. Control device for a bar transfer according to claim 1, wherein said means for driving said lever comprises an eccentric shaft on said lever and a tie rod connecting said eccentric shaft and said crank pin.

5. Control device for a bar transfer according to claim 4, wherein said planet pinion is mounted eccentrically on a driven control wheel, said driven control wheel associated with said fixed toothed gear wheel which meshes with said planet pinion said driven control wheel and gear wheel coaxial to said fixed axis of rotation of said lever, the number of teeth of said planet pinion being equal to half that of said toothed gear wheel, and wherein said crank pin is eccentrically connected with and adjacent to the radius of, said planet pinion.

6. Control device for a bar transfer according to claim 1, further comprising a housing enclosing said means for driving said lever, wherein said fixed axis of rotation is disposed essentially at the center of said housing, and wherein said lever and said arm are outside the housing.

7. Control device for a bar transfer according to claim 6, wherein said the housing includes a flange for fixing and support on the frame of the transfer path.

8. Control device for a bar transfer according to claim 1, wherein said lever constitutes a sealed housing enclosing said drive mechanism for the arm and having a sealing joint with a support for the axis of rotation of said lever.

9. Control device for a bar transfer according to claim 1, comprising a housing, and wherein said means for driving said lever comprises a driven control wheel operated by a worm screw, said worm screw having a drive shaft projecting outside of said housing and connected to a part driven by a motor and to a braking device.

10. Control device for a bar transfer according to claim 9, wherein said drive shaft further comprises a fly wheel and a coupling.

* * * * *